April 14, 1964     H. M. BARNUM     3,128,902
HISTOLOGIC TISSUE RECEPTACLE
Filed May 13, 1963
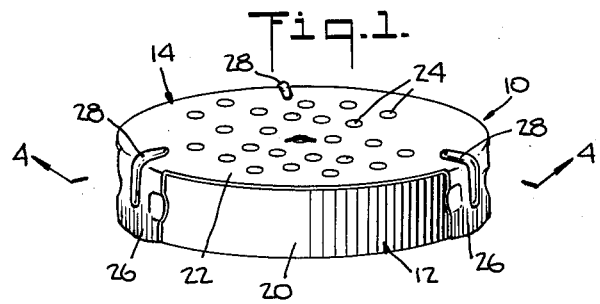
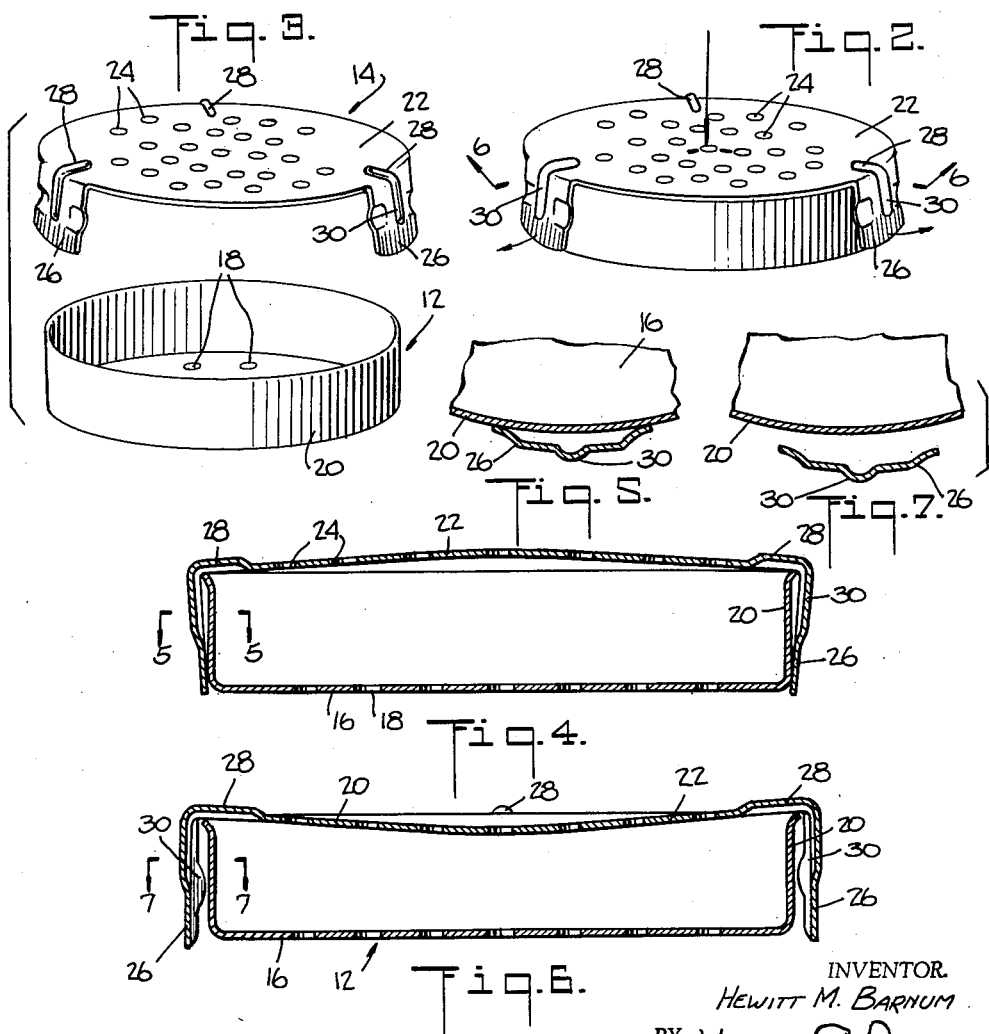
INVENTOR.
HEWITT M. BARNUM
BY
ATTORNEY United States Patent Office 3,128,902
Patented Apr. 14, 1964

3,128,902
HISTOLOGIC TISSUE RECEPTACLE
Hewitt M. Barnum, Rye, N.Y., assignor to The Technicon Company, Inc., Chauncey, N.Y., a corporation of New York
Filed May 13, 1963, Ser. No. 279,720
3 Claims. (Cl. 220—60)

This invention relates to histologic tissue receptacles which are employed for holding tissue specimens while they are being treated with various liquids in preparation for microscopic examination.

The tissue receptacle of the type to which this invention relates is usually made of stainless steel which is inert to the various liquids with which the tissue specimens are treated and comprises a cover which is in the form of a spring disk which has a plurality of circumferentially spaced tabs which engage the peripheral side wall of the receptacle to hold the cover releasably in place when the spring disk is flexed outwardly convex. The cover is easily and quickly releasable by pressing on its upper surface which results in the cover being flexed outwardly concave and concomitantly disengages the tabs from cover holding position, i.e., in a direction away from the side wall of the receptacle. In order to re-engage the tabs with the side wall of the receptacle for securing the cover in position, it is necessary to press the tabs toward the side wall of the receptacle and thereby flex the cover to its outwardly convex form so that the tabs engage the side wall of the receptacle and hold the cover in place as previously described.

One object of the invention is to facilitate the manipulation of the cover tabs for flexing the cover disk to its outwardly convex formation for the releasable securement of the cover to the receptacle body.

Another object is to provide a tissue receptacle with a cover having improved means for releasably securing the cover to the receptacle body.

Briefly described, the above stated and other objects, which might hereinafter appear, are accomplished by providing the cover with stiffening elements which extend radially in the marginal edge portion of the cover in the region of the tabs and which extend into the tabs so that when the tabs are manipulated for moving them into engagement with the side wall of the receptacle, the stiffening elements increase the force on the cover disk to flex the latter with a snap action into its outwardly convex formation and the tabs are firmly held by the spring action of the flexed disk into engagement with the side of the receptacle, thereby facilitating the cover attaching manipulation and improving the securement of the cover to the receptacle body. Conversely, the stiffening elements improve the action of the cover for disengaging the tabs from the side wall of the receptacle body when the cover is flexed toward the bottom of the receptacle, to an outwardly concave formation, by pressure applied centrally of the cover disk toward the bottom of the receptacle.

The above and other objects, features and advantages of the invention will be clearly understood from the following description considered in connection with the accompanying drawings which are illustrative of the presently preferred embodiment of the invention.

In the drawings:
FIG. 1 is a perspective view of a receptacle embodying the present invention, showing the cover disk in its outwardly convex condition;
FIG. 2 is a view similar to FIG. 1 showing the cover disk in its outwardly concave condition;
FIG. 3 is an exploded perspective view of the receptacle body and the cover separated from each other;
FIG. 4 is a vertical sectional view on the line 4—4 of FIG. 1;
FIG. 5 is a fragmentary sectional view on the line 5—5 of FIG. 4;
FIG. 6 is a sectional view on the line 6—6 of FIG. 2; and
FIG. 7 is a fragmentary sectional view on the line 7—7 of FIG. 6.

Referring now to the drawings in detail, the tissue receptacle 10 comprises the receptacle body 12 and a cover 14, both preferably made of stainless steel although either or both may be made of any other suitable material. The receptacle body 12 comprises a bottom 16 provided with a plurality of small openings 18 for access of the liquid to the tissue specimens for the treatment of the latter with various liquids. The receptacle body 12 has a peripheral side wall 20 of cylindrical form. The cover 14 comprises the spring disk 22 which is provided with a plurality of small openings 24 which, like the openings 18, allow the free flow of liquid into and out of the receptacle. The cover disk 22 is provided with a plurality of, preferably three, tabs 26 which are movable into and out of engagement with the peripheral side wall 20 of the receptacle body for securing the cover thereto and for releasing the cover therefrom. When the cover disk 22 is in its outwardly convex form, as illustrated by FIGS. 1 and 4, the tabs 26 engage the side wall 20 for holding the cover in position on the receptacle body. By pressing inwardly on the center portion of the cover disk, it is flexed into the outwardly concave form illustrated by FIGS. 2 and 6 for disengaging the tabs or fingers 26 from the side wall 20 to allow the removal of the cover from the receptacle body.

The cover disk 22 is provided in its outer marginal edge portion with a plurality of stiffening elements 28 which, as here shown, are in the form of ribs pressed outwardly from the cover disk. Said ribs 28 have integral portions 30 formed in the tabs 26 as continuations of ribs 28. The stiffening elements or ribs 28, 30 facilitate the manipulation required for flexing the cover disk 22 from its outwardly concave form, illustrated by FIGS. 2 and 6, to its outwardly convex form illustrated by FIGS. 1 and 4. More particularly, when the cover is placed in position on the receptacle body 12, as illustrated by FIG. 6, and the tabs 26 are pressed toward the side wall 20, the pressure on said tabs is effectively transmitted to the marginal side edge of the cover disk 22 for flexing it with a snap action to its outwardly convex form as a result of which the tabs 26 are firmly engaged with the side wall 20 of the receptacle. Thus, the stiffening elements 28, 30 not only act to provide adequate flexing forces on the cover to flex it to its outwardly convex form but also serve to increase the holding action of the tabs against the side wall of the receptacle.

Although tissue receptacles of the type to which this invention relates are well known to pathologists and their technicians, it may be noted that these receptacles are ordinarily used for holding tissue specimens while they are being treated with various liquids in automatic immersion apparatus known as tissue processing machines. As an example and without limitation, the tissue receptacles may be employed in the processing of tissue in automatic immersion apparatus such as that shown by United States patents, Nos. 2,341,197 and 2,872,893, and by other patents owned by the assignee of my present application.

While I have shown and described the preferred embodiment of my invention, it will be understood that the invention may be embodied otherwise than as herein specifically illustrated or described and that in the illustrated embodiment, certain changes in the details of construc-

What I claim is:

1. A tissue receptacle for use in processing histologic tissue specimens for microscopic examination, comprising a receptacle body having a cylindrical side wall, and a removable cover therefor releasably securable to said receptacle body, said cover comprising a flexible circular disk and circumferentially spaced fingers integral with said disk and releasably engageable with said cylindrical side wall of the receptacle body in cover securing relation thereto when said disk is in flexed outwardly convex form and in cover releasing relation to said side wall when said disk is flexed from said outwardly convex form, said fingers having stiffening ribs formed therein and the marginal edge portion of said disk having stiffening ribs therein extending radially in said disk from and as continuations of said finger ribs, respectively, to facilitate restoring said disk to said outwardly convex form when the cover is placed on the receptacle body and said fingers are pressed toward said side wall for securing said cover to the receptacle body, said stiffening ribs in said disk terminating in said marginal edge portion thereof and said fingers having free end portions devoid of said ringer ribs.

2. A tissue receptacle for use in processing histologic tissue specimens for microscopic examination, comprising a receptacle body having a cylindrical side wall, and a removable cover therefor releasably securable to said receptacle body, said cover comprising a flexible circular disk and circumferentially spaced fingers, integral with said disk and releasably engageable with said cylindrical side wall of the receptacle body in cover securing relation thereto when said disk is in flexed outwardly convex form and in cover releasing relation to said side wall when said disk is flexed from said outwardly convex form, said fingers having stiffening elements formed therein and the marginal edge portion of said disk having stiffening elements therein extending radially in said disk from and as continuations of said finger elements, respectively, to facilitate restoring said disk to said outwardly convex form when the cover is placed on the receptacle body and said fingers are pressed toward said side wall for securing said cover to the receptacle body, said stiffening elements of said fingers extending longitudinally of said fingers, respectively.

3. A tissue receptacle for use in processing histologic tissue specimens for microscopic examination, comprising a receptacle body having a cylindrical side wall, and a removable cover therefor releasably securable to said receptacle body, said cover comprising a flexible circular disk and circumferentially spaced fingers integral with said disk and releasably engageable with said cylindrical side wall of the receptacle body in cover securing relation thereto when said disk is in flexed outwardly convex form and in cover releasing relation to said side wall when said disk is flexed from said outwardly convex form, said fingers having stiffening elements formed therein and the marginal edge portion of said disk having stiffening elements therein extending radially in said disk from and as continuations of said finger elements, respectively, to facilitate restoring said disk to said outwardly convex form when the cover is placed on the receptacle body and said fingers are pressed toward said side wall for securing said cover to the receptacle body, said stiffening elements of said fingers extending longitudinally of said fingers, respectively, all of said stiffening elements being outwardly pressed portions of said cover.

References Cited in the file of this patent

UNITED STATES PATENTS

| | | |
|---|---|---|
| 1,110,661 | Westerleck | Sept. 15, 1914 |
| 2,765,097 | Dobson et al. | Oct. 2, 1956 |
| 2,776,065 | Loretitsch | Jan. 1, 1957 |